US012209741B1

(12) United States Patent
Zhao

(10) Patent No.: US 12,209,741 B1
(45) Date of Patent: Jan. 28, 2025

(54) LASER LAMP MODULE CAPABLE OF ACTIVE HEAT DISSIPATION AND LASER LAMP THEREOF

(71) Applicant: Jun Zhao, Zhongshan (CN)

(72) Inventor: Jun Zhao, Zhongshan (CN)

( * ) Notice: Subject to any disclaimer, the term of this patent is extended or adjusted under 35 U.S.C. 154(b) by 0 days.

(21) Appl. No.: 18/764,386

(22) Filed: Jul. 5, 2024

(51) Int. Cl.
*F21V 29/67* (2015.01)
*F21V 21/08* (2006.01)
*F21V 31/00* (2006.01)
*F21Y 113/13* (2016.01)
*F21Y 115/30* (2016.01)

(52) U.S. Cl.
CPC ........ *F21V 29/673* (2015.01); *F21V 21/0824* (2013.01); *F21V 31/005* (2013.01); *F21Y 2113/13* (2016.08); *F21Y 2115/30* (2016.08)

(58) Field of Classification Search
CPC ........... F21V 21/0824; F21V 29/50–70; F21V 31/00–03; F21Y 2113/13; F21Y 2115/30
See application file for complete search history.

(56) References Cited

U.S. PATENT DOCUMENTS 10,060,613 B2 * 8/2018 Qin ......................... F21S 8/081
10,605,438 B2 * 3/2020 Veloskey ................ F21V 17/02

* cited by examiner

*Primary Examiner* — Jason M Han
(74) *Attorney, Agent, or Firm* — Jose Cherson Weissbrot

(57) ABSTRACT

The present disclosure discloses a laser lamp module capable of active heat dissipation, including a laser lamp module body, a glass sheet, a tri-color laser module, and a fan. The laser lamp module body includes a front casing, a housing, a rear casing, an internal thread interface, an air inlet, and an external thread interface. The air inlet is connected to one side of the housing. The air inlet is specifically hidden at the position where the housing and the front casing are connected, which can provide an effective waterproof effect. According to the present disclosure, a heat dissipation function is added to the laser lamp with a pattern effect, which is simple in structure and reasonable in design. By ways of the design and cooperation of the air inlet and the fan, the heat produced by working in the housing can be removed in time.

7 Claims, 4 Drawing Sheets

LASER LAMP MODULE CAPABLE OF ACTIVE HEAT DISSIPATION AND LASER LAMP THEREOF

TECHNICAL FIELD

The present disclosure relates to the technical field of laser lamp modules, and in particular, to a laser lamp module capable of active heat dissipation and a laser lamp thereof.

BACKGROUND

High-power laser lamps with a pattern effect are mainly used in the following occasions: large stadium activities or performances, using seamless splicing technology to project super-large pictures or play videos, such as animation performances; large stage performances, to produce special effects on the stage, e.g., to simulate various scenes and styles in dramatic performances; on-site interaction, which can be realized by editing the video taken on site;

special effects in film photography and advertisements, to project special effects in film and television works; and wedding celebration services, in which digital projection lamps can project patterns and backgrounds that can change and flow in the whole space.

The traditional laser lamp may overheat during use due to high power of the laser module. If the heat is not removed in time, the laser module is prone to damage. In less severe case, the laser module is prone to freezing; and in severe case, the laser module may even burn out directly, which seriously affects the service life of the product, so there is an urgent need for a new product.

SUMMARY

An objective of the present disclosure is to provide a laser lamp module capable of active heat dissipation and a laser lamp thereof so as to solve the problems proposed in the background above.

In order to achieve the above objective, the present disclosure provides the following technical solution: a laser lamp module capable of active heat dissipation includes a laser lamp module body, a glass sheet, a tri-color laser module, and a fan. The laser lamp module body includes a front casing, a housing, a rear casing, an internal thread interface, an air inlet, and an external thread interface. The air inlet is provided on one side of the housing. The air inlet is specifically hidden at the position where the housing and the front casing are connected, which can provide an effective waterproof effect.

The internal thread interface and the external thread interface are respectively connected to two sides of the bottom of the housing. A front casing sealing ring, the glass sheet, a special-shaped film sheet, a film holder, a circular film sheet, a motor, the tri-color laser module, a module holder, a circuit board, a rear casing sealing ring, and the fan are contained in the front casing, the housing, and the rear casing. Due to the cooperation between the fan and the air inlet, the structure in the laser lamp module body is reasonable for heat dissipation, which prolongs the service life of the device.

Preferably, the front casing sealing ring is matched with the front casing.

Preferably, the tri-color laser module is matched with the module holder.

Preferably, the rear casing sealing ring is matched with the rear casing.

A laser lamp includes the laser lamp module capable of active heat dissipation. A matched underground assembled holder component is assembled at the bottom of the laser lamp module body. The underground assembled holder component includes an upper holder, a middle holder, and a lower holder. The upper holder, the middle holder, and the lower holder can be assembled freely, so that the height of the laser lamp module body in use can be controlled.

Preferably, the upper holder and the lower holder are respectively connected to the top and the bottom of the middle holder.

Preferably, the top of the upper holder is connected with an internal thread connecting sleeve matched with the external thread interface. The internal thread connecting sleeve is threadedly connected to the external thread interface, so that the underground assembled holder component and the laser lamp module body can be assembled together.

Compared with the prior art, the present disclosure has the following beneficial effects:

(1) According to the laser lamp module capable of active heat dissipation and the laser lamp thereof, a heat dissipation function is added to the laser lamp with a pattern effect, which is simple in structure and reasonable in design. By ways of the design and cooperation of the air inlet and the fan, and because the air inlet is specifically hidden at the position where the housing and the front casing are connected, which can provide an effective waterproof effect. Driven by the fan, air enters via the air inlet and is blown out by the fan through the rear casing, so that the temperature is lowered. In actual use, in order to facilitate rapid heat removal at the laser module, the laser module is specially mounted in the structure formed by the housing, the front casing, and the rear casing, in which the air inlet and the fan are provided. The air inlet and the fan cooperate to realize rapid cooling and heat removal, thereby further preventing heat accumulation.

(2) According to the laser lamp module capable of active heat dissipation and the laser lamp thereof, by arranging the underground assembled holder component including the upper holder, the middle holder, and the lower holder which can be assembled, the laser lamp is applicable to places of different heights. Then, by ways of the arrangement and cooperation of the internal thread connecting sleeve, the internal thread interface, and the external thread interface, the underground assembled holder component can be threadedly connected to the laser lamp module body conveniently and rapidly, which is simple to operate and convenient for disassembly and carrying subsequently, thereby making the device more convenient to use.

In the figures: 1, laser lamp module body; 101, front casing; 102, housing; 1021, internal thread interface; 1022, air inlet; 1023, external thread interface; 103, rear casing; 2, underground assembled holder component; 201, upper holder; 2011, internal thread connecting sleeve; 202, middle holder; 203, lower holder; 3, front casing sealing ring; 4, glass sheet; 5, special-shaped film sheet; 6, film holder; 7, circular film sheet; 8, motor; 9, tri-color laser module; 10, module holder; 11, circuit board; 12, rear casing sealing ring; and 13, fan.

DETAILED DESCRIPTION

The technical solutions in the embodiments of the present disclosure will be described below clearly and completely with reference to the accompanying drawings in the embodiments of the present disclosure. All other embodiments obtained by a person of ordinary skill in the art based on the embodiments of the present disclosure without creative efforts shall fall within the protection scope of the present disclosure.

Figure 1:
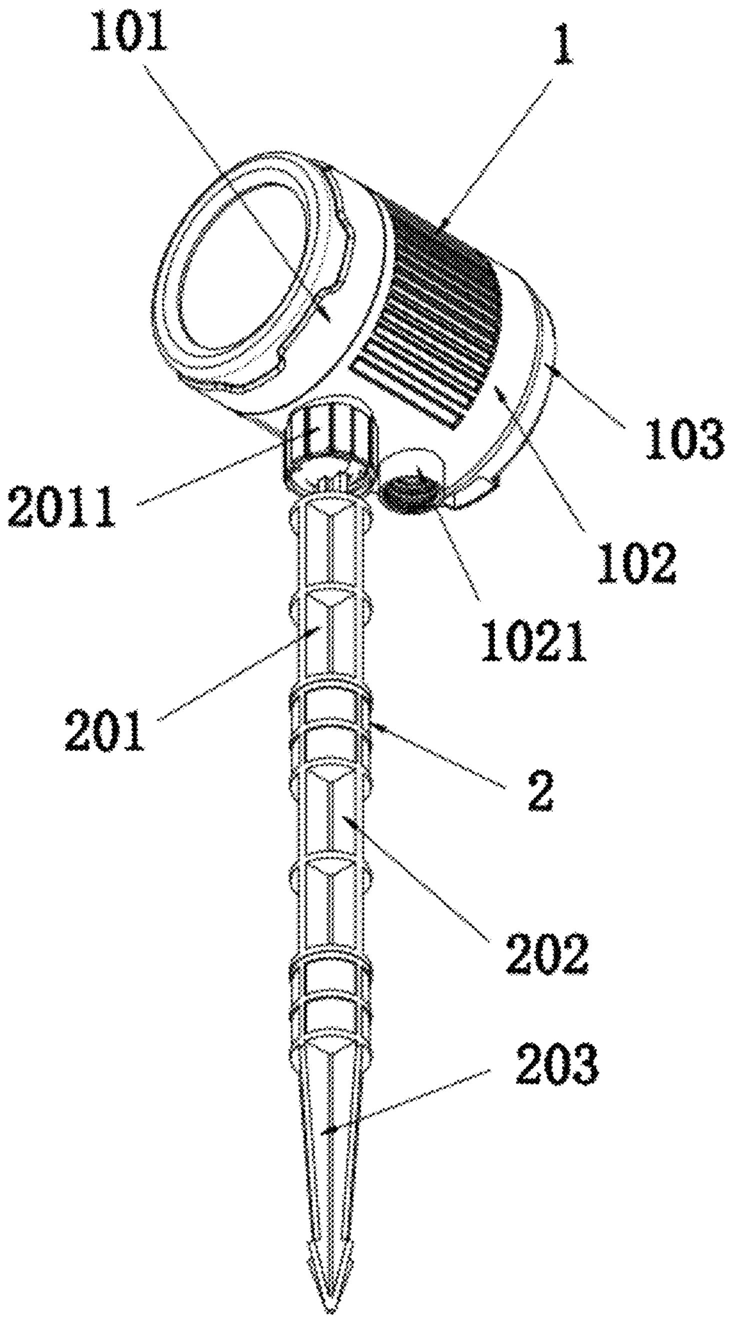
FIG. 1 is a schematic structural diagram of the present disclosure.
Figure 2:
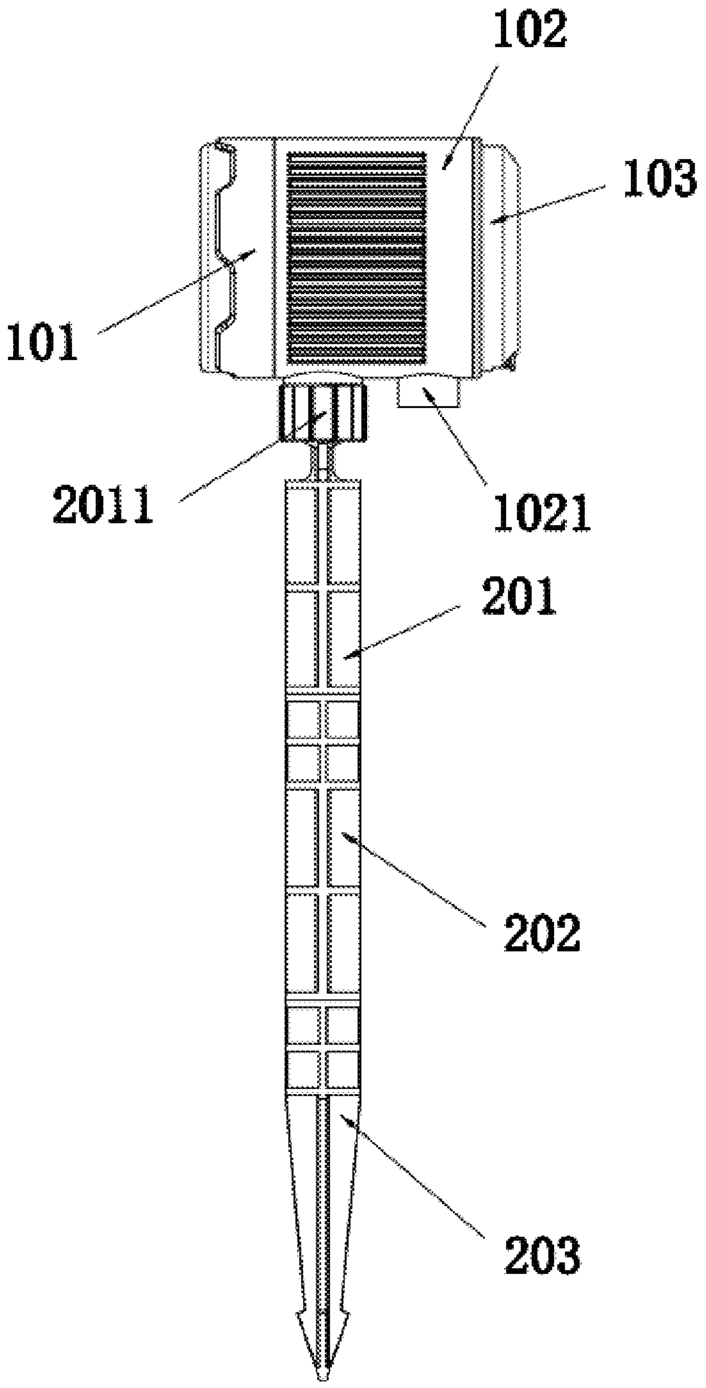
FIG. 2 is a schematic structural side view of the present disclosure.
Figure 3:
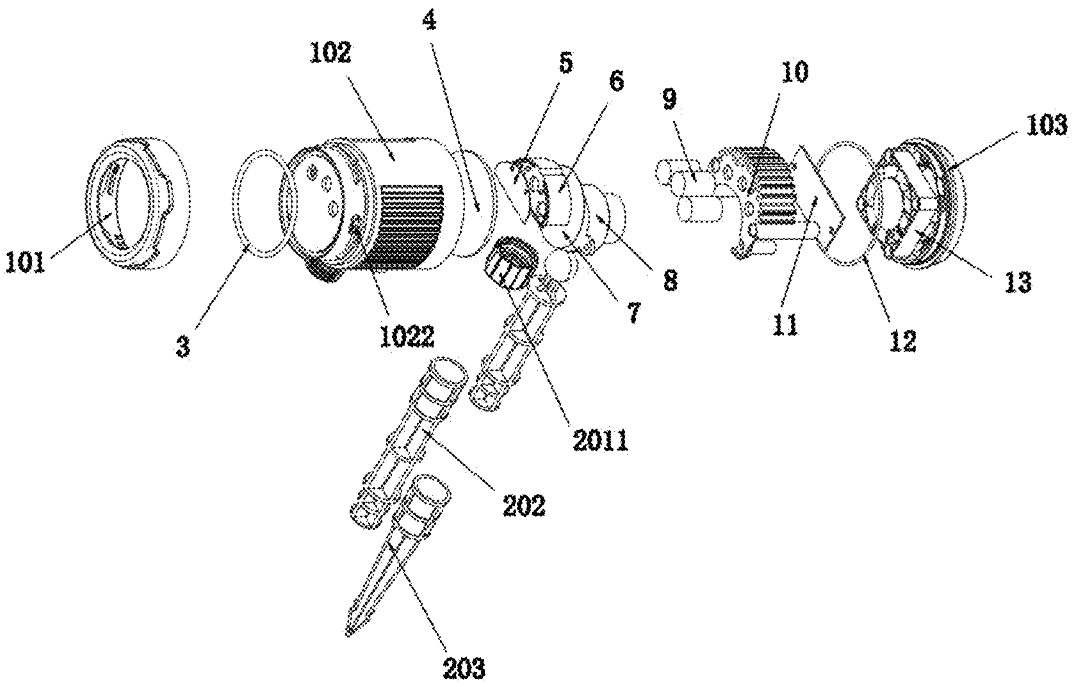
FIG. 3 is a schematic structural exploded view I of the present disclosure.
Figure 4:
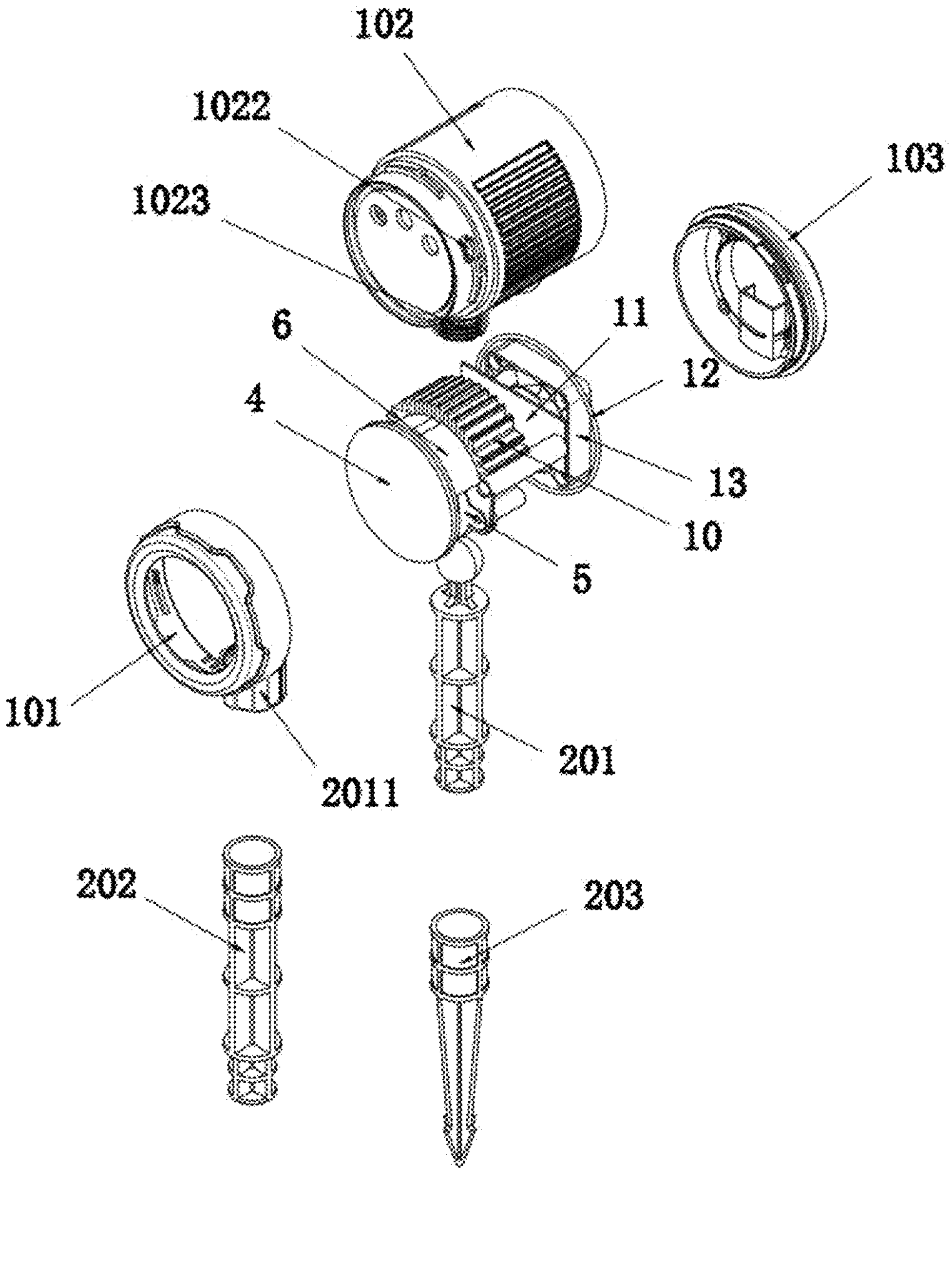
FIG. 4 is a schematic structural exploded view II of the present disclosure.

Referring to FIG. 1 to FIG. 4, in an embodiment provided by the present disclosure, a laser lamp module capable of active heat dissipation includes a laser lamp module body 1, a glass sheet 4, a tri-color laser module 9, and a fan 13. The laser lamp module body 1 includes a front casing 101, a housing 102, a rear casing 103, an internal thread interface 1021, an air inlet 1022, and an external thread interface 1023. The air inlet 1022 is provided on one side of the housing 102. The internal thread interface 1021 and the external thread interface 1023 are respectively connected to two sides of the bottom of the housing 102. A front casing sealing ring 3, the glass sheet 4, a special-shaped film sheet 5, a film holder 6, a circular film sheet 7, a motor 8, the tri-color laser module 9, a module holder 10, a circuit board 11, a rear casing sealing ring 12, and the fan 13 are contained in the front casing 101, the housing 102, and the rear casing 103. Driven by the fan 13, air enters via the air inlet 1022 and is blown out by the fan 13 through the rear casing 103, so that the temperature is lowered.

The front casing sealing ring 3 is matched with the front casing 101, the tri-color laser module 9 is matched with the module holder 10, and the rear casing sealing ring 12 is matched with the rear casing 103.

A laser lamp includes the laser lamp module capable of active heat dissipation. A matched underground assembled holder component 2 is assembled at the bottom of the laser lamp module body 1. The underground assembled holder component 2 includes an upper holder 201, a middle holder 202, and a lower holder 203. By arrangement of the underground assembled holder component 2, the underground assembled holder component 2 includes the upper holder 201, the middle holder 202, and the lower holder 203 which can be assembled, and the laser lamp is applicable to places of different heights.

The upper holder 201 and the lower holder 203 are respectively connected to the top and the bottom of the middle holder 202.

The top of the upper holder 201 is connected with an internal thread connecting sleeve 2011 matched with the external thread interface 1023. By ways of the arrangement and cooperation of the internal thread connecting sleeve 2011, the internal thread interface 1021, and the external thread interface 1023, the underground assembled holder component 2 can be threadedly connected to the laser lamp module body 1 conveniently and rapidly.

When the embodiment of this application is in use: in actual use, in order to facilitate rapid heat removal at the laser module, the laser module is specially mounted in the structure formed by the housing 102, the front casing 101, and the rear casing 103, in which the air inlet 1022 and the fan 13 are provided. Driven by the fan 13, air enters via the air inlet 1022 and is blown out by the fan 13 through the rear casing 103, so that the temperature is lowered. By ways of the arrangement and cooperation of the internal thread connecting sleeve 2011, the internal thread interface 1021, and the external thread interface 1023, the underground assembled holder component 2 can be threadedly connected to the laser lamp module body 1 conveniently and rapidly, which is simple to operate and convenient for disassembly and carrying subsequently.

What is claimed is:

1. A laser lamp module capable of active heat dissipation, comprising a laser lamp module body (1), a glass sheet (4), a tri-color laser module (9), and a fan (13), wherein the laser lamp module body (1) comprises a front casing (101), a housing (102), a rear casing (103), an internal thread interface (1021), an air inlet (1022), and an external thread interface (1023); the air inlet (1022) is provided on one side of the housing (102); the air inlet (1022) is specifically hidden at the position where the housing (102) and the front casing (101) are connected; the internal thread interface (1021) and the external thread interface (1023) are respectively connected to two sides of the bottom of the housing (102); and a front casing sealing ring (3), the glass sheet (4), a special-shaped film sheet (5), a film holder (6), a circular film sheet (7), a motor (8), the tri-color laser module (9), a module holder (10), a circuit board (11), a rear casing sealing ring (12), and the fan (13) are contained in the front casing (101), the housing (102), and the rear casing (103).

2. The laser lamp module capable of active heat dissipation according to claim 1, wherein the front casing sealing ring (3) is matched with the front casing (101).

3. The laser lamp module capable of active heat dissipation according to claim 1, wherein the tri-color laser module (9) is matched with the module holder (10).

4. The laser lamp module capable of active heat dissipation according to claim 1, wherein the rear casing sealing ring (12) is matched with the rear casing (103).

5. A laser lamp, comprising the laser lamp module capable of active heat dissipation according to claim 1, wherein a matched underground assembled holder component (2) is assembled at the bottom of the laser lamp module body (1), and the underground assembled holder component (2) comprises an upper holder (201), a middle holder (202), and a lower holder (203).

6. The laser lamp according to claim 5, wherein the upper holder (201) and the lower holder (203) are respectively connected to the top and the bottom of the middle holder (202).

7. The laser lamp according to claim 6, wherein the top of the upper holder (201) is connected with an internal thread connecting sleeve (2011) matched with the external thread interface (1023).

* * * * *